(12) United States Patent
Domingue

(10) Patent No.: US 6,227,225 B1
(45) Date of Patent: May 8, 2001

(54) METHOD FOR PULLING A VALVE SEAT

(76) Inventor: Gregory A. Domingue, 2954 W. Gloria Switch Rd., Carencro, LA (US) 70520

(*) Notice: Subject to any disclaimer, the term of this patent is extended or adjusted under 35 U.S.C. 154(b) by 0 days.

(21) Appl. No.: 09/354,499

(22) Filed: Jul. 16, 1999

(51) Int. Cl.[7] ............................................... F16K 43/00
(52) U.S. Cl. ............................ 137/15.18; 137/15.17; 137/315.41; 137/327; 29/213.1; 29/221.6; 417/454
(58) Field of Search ....................... 137/15.17, 15.18, 137/15.22, 15.23, 15.24, 315.17, 315.18, 315.19, 315.2, 315.21, 315.3, 315.31, 315.41, 315.42, 327, 328; 29/213.1, 221.6; 417/454

(56) References Cited

U.S. PATENT DOCUMENTS

| | | | |
|---|---|---|---|
| 2,271,137 | * 1/1942 | Hamer | 137/327 |
| 2,937,657 | * 5/1960 | Miller et al. | 29/213.1 |
| 3,029,501 | * 4/1962 | Leathers | 29/213.1 |
| 4,520,842 | * 6/1985 | Elliott | 137/327 |
| 4,618,316 | * 10/1986 | Elliott | 417/454 |
| 4,627,492 | 12/1986 | MacLaughlin | 166/250 |
| 4,632,141 | * 12/1986 | Post | 137/327 |
| 4,928,726 | * 5/1990 | Johnson et al. | 137/327 |
| 5,305,833 | 4/1994 | Collins | 166/386 |
| 5,355,953 | 10/1994 | Shy et al. | 166/250 |
| 5,474,124 | 12/1995 | Samuels et al. | 166/85.1 |
| 5,592,965 | 1/1997 | Rakieski | 29/213.1 |
| 5,975,104 | * 11/1999 | Wilkins | 137/315.41 |

OTHER PUBLICATIONS

Wheatley Operators Manual;P–364 Plunger Pump, pp. 1–10.

* cited by examiner

Primary Examiner—George L. Walton
(74) Attorney, Agent, or Firm—Dominque & Waddell, PLC

(57) ABSTRACT

An apparatus for pulling a valve member from a pump. The apparatus comprises a puller stem containing external threads and a bushing having an inner surface, and wherein the puller stem is disposed through the bushing. Also included is a first halve nut containing first internal threads, and a second halve nut also containing internal threads. The first end of the bushing will abut both the first halve nut and the second halve nut. The apparatus further includes a sleeve having an outer portion and an inner portion, and wherein the inner portion has the threaded stem therethrough. The sleeve will engage the first halve nut and the second halve nut. In the preferred embodiment, the apparatus further comprises a first lip attached to the first halve nut and a second lip attached to the second halve nut. The sleeve contains a collar that is concentrically disposed about the sleeve, the collar having an overlapping leg that forms a chamber, and wherein the first and second lip are disposed within the chamber. The apparatus may further comprise a valve puller attached to the puller stem for engaging and pulling a plurality of the valve members from the pump. A method of removing a plurality of valves from a pump is also disclosed.

5 Claims, 6 Drawing Sheets

FIGURE 1  FIGURE 3

METHOD FOR PULLING A VALVE SEAT

BACKGROUND OF THE INVENTION

This invention relates to fastening and unfastening an apparatus to a threaded bolt. More particularly, but not by way of limitation, this invention relates to a slip-nut apparatus and method of using the slip-nut about a threaded bolt.

In the industrial applications, pumps are used on a regular and frequent basis. The types of industrial pumps include, but are not limited to, triplex pumps, centrifuge pumps, etc. During the course of pump use, operators will find it necessary to pull valve seats. The reason for pulling out the valve seats will vary, as will be understood by those of ordinary skill in the art. For instance, the valve seat may become damaged, clogged, corroded, etc. Therefore, the valve seat may need to be repaired and/or replaced.

Regardless of the specific reason for pulling the valve seat, the operation has proved to be time consuming. In normal operation, a puller stem with attached valve seat puller is inserted into a passageway in the pump. The puller plate will abut the pump case. A wrench is threadedly disposed about the puller stem and is adjacent the puller plate. The puller stem is rotated which in turn advances the valve seat puller into engagement with the valve seat. The valve seat can then be pulled.

Additionally, the operator will then pull the second valve seat. The wrench will be backed-off by rotating the wrench thereby allowing the wrench to advanced via the threads to the desired length of the second valve seat. The advancement is accomplished by the rotational engagement of the thread means of the wrench and puller stem as is understood by those of ordinary skill in the art.

A major disadvantage of the prior art puller stems is that the threaded shaft may contain nicks, cuts, corrosion and/or other damage. Thus, in the advancement of the wrench about the puller stem, a great amount of time is consumed. As will be understood by those of ordinary skill in the art, operators want to minimize the amount of time that the pumps are out of service. Thus, the amount of time for advancing the wrench is a significant problem in the terms of productivity. Also, when the puller stem contains damaged threads, the task can be physically challenging for the operator.

Therefore, there is a need for a slip-nut that can be used in conjunction with a threaded shaft. There is also a need for an apparatus that will make it easier for operators to change valve seats from pumps. There is also a need for a method for changing valve seats in a more efficient and economical fashion.

SUMMARY OF THE INVENTION

An apparatus for pulling a valve member from a pump is disclosed. The apparatus comprises a puller stem containing external thread means and a bushing having an inner surface, and wherein said puller stem is disposed through the bushing. Also included is a first halve nut containing a first internal thread means configured to partially engaging the external thread means, and a second halve nut containing a second internal thread means configured to partially engaging the external thread means. The first end of the bushing will abut both the first halve nut and the second halve nut. Also included in one embodiment is a spring separating the two halves apart.

The apparatus further includes a sleeve having an outer portion and an inner portion, and wherein the inner portion has the threaded stem therethrough. The sleeve will engage the first halve nut and the second halve nut. In the preferred embodiment, the apparatus further comprises a first lip attached to the first halve nut and a second lip attached to the second halve nut. A collar is also included, with the collar concentrically disposed about the sleeve, the collar having an overlapping leg that forms a chamber, and wherein the first lip end of the first halve nut and the second lip end of the second halve nut is disposed within the chamber.

In the preferred embodiment, the first end of the bushing contains an angled inner shoulder and wherein the second end of the first halve contains an outer shoulder that cooperates with the angled inner shoulder and the second halve contains an outer shoulder that cooperates with the angled inner shoulder. The apparatus may further comprise a valve puller having a first end and a second end, with the first end having means for engaging the valve member and the second end engaged with the threaded stem.

The engaging means will include a prong assembly attached to the first end of the valve puller, the prong assembly being configured to insert into a pattern of openings located on the valve member.

A method of advancing a threaded stem through a nut member is also disclosed. The nut member comprises a bushing having an inner surface which contains the threaded stem therethrough, a first halve nut containing a first internal thread means configured to engage the threaded stem, and a second halve nut containing a second internal thread means configured to engage the threaded stem. The nut member also contains a sleeve having an outer portion and an inner portion, and wherein the inner portion has the threaded stem therethrough. In the preferred embodiment, the threaded stem is part of a device used to retrieve valve seats from a pump, and wherein the threaded stem has engaged at one end a valve seat puller.

The method comprises engaging the puller plate on a pump opening and advancing the first halve nut and the second half nut. Next, the first halve nut and the second half nut is abutted against the puller plate and a rotational force is exerted on the sleeve which in turn will cause the first halve nut and the second half nut to close about the threaded stem. The operator will rotate the threaded stem which in turn will cause the passing of the threads of the threaded stem through the first internal thread means and the second internal thread means thereby advancing the valve seat puller. The continued advancement will engage the first valve seat with the valve seat puller via the valve seat puller.

Next, the method may comprise exerting an upward force on the threaded stem and exerting a counter-rotational force on the sleeve which in turn will expand the first halve nut and the second half nut about the threaded stem. The first valve seat is then removed from the pump.

The method may then comprise placing the puller plate on an opening of a pump and advancing the first halve nut and the second half nut until the angled end of the first and second halve nut abut the bushing. The operator would then exert a rotational force on the sleeve which will in turn close the first and second halve nut about the threaded stem. The operator would then rotate the threaded stem which in turn will advance the valve seat puller into engagement with a second valve seat via the valve seat puller.

The method would further include exerting an upward force on the threaded stem and counter rotating the sleeve. The first halve nut and the second half nut will expand about the threaded stem so that the internal threads are no longer in engagement with threaded stem. The second valve seat may then be removed. In the preferred embodiment, the step of rotating the threaded bolt includes passing the threads of the threaded bolt through the first internal thread means and the second internal thread means.

An advantage of the present invention includes allowing placement of the slip nut at the desired position without having to threadedly advance about the threaded stem as is the case with prior art wrenches. Another advantage is if the threaded stem becomes damaged, the operator can still use the threaded stem due to the novel design herein disclosed. Yet another advantage is the novel device is economical to manufacture and maintain. Still yet another advantage is that use of the novel device will save operators significant time in the changing out of valves from pump cases.

A feature of the present invention includes having a nut member that is longitudinally separated into two halves. Another feature is that the first half nut and the second half nut can be biased together. Yet another feature is that the sleeve is used to transmit a force which drives the two halves together about the threaded stem. Still yet another feature is that the bushing will engage the puller plate, with the puller plate engaging the pump case thereby enabling the sleeve to transmit the force to the two halves as previously stated.

These and other features will become apparent from a reading of the detailed description of the preferred embodiments.

BRIEF DESCRIPTION OF THE DRAWINGS

FIG. 3 is an illustration of the novel device of FIG. 2.

DETAILED DESCRIPTION OF THE PREFERRED EMBODIMENTS

Figure 1:
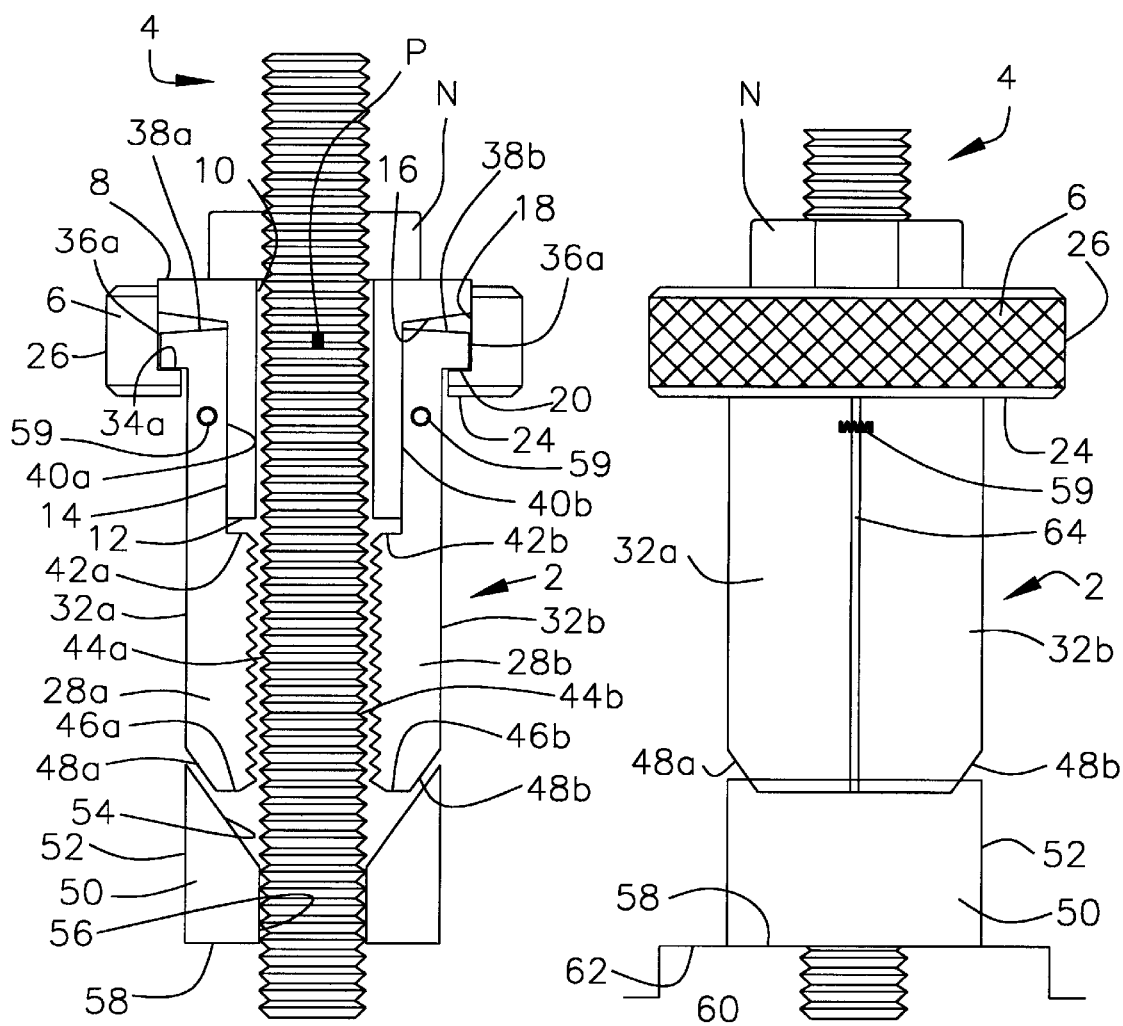
FIG. 1 is a cross-sectional view of the novel device about a threaded stem.

With reference to FIG. 1, a cross-sectional view of the novel device 2 will now be described. The device 2 is disposed about a threaded stem 4. The device 2 and stem 4 are operatively associated with a pump in order to remove valve seats therefrom. One such pump is a Wheatley Plunger Pump that is commercially available from Wheatley Company under the product number P-364. An operators manual for the P-364 plunger pump, pages one through ten were made a part of the Information Disclosure Statement and is incorporated herein by reference.

The device 2 includes a sleeve (also referred to as collar) 6, the sleeve 6 having an upper end 8 that extends to the first inner cylindrical surface 10 that in turn will terminate at the radial end 12. The radial end 12 will extend to an outer cylindrical surface 14 that will terminate at the angled shoulder 16, with the angled shoulder extending to the second inner cylindrical surface 18. The inner cylindrical surface 18 will terminate at the radial lip 20 that in turn extends to the third inner cylindrical surface 22, with the third inner cylindrical surface 22 terminating at the lower end 24 that in turn extends to the outer surface 26. Note that the angled shoulder 16, inner surface 18 and radial lip 20 form a chamber.

In the preferred embodiment shown in FIG. 1, a first half nut 28a and a second half nut 28b is provided. Generally, the first half nut 28a and the second half nut 28b are a nut member that has been longitudinally separated into two halves. It is to be understood that the nut member could have been longitudinally separated into thirds, fourths, fifths, etc in other embodiments.

The first half nut 28a comprises an outer curved surface 32a that extends to the radial shoulder 34a which in turn extends to the outer surface 36a. The outer surface 36 extends to the angled top surface 38a that will then stretch to the first inner partially cylindrical surface 40a, with the first inner partially cylindrical surface 40a concluding at the inner shoulder 42a. The inner shoulder 42a extends to the internal thread means 44a. The internal thread means 44a will have a partial contour about the threaded stem 4. The internal thread means 44a conclude at the end 46a, with the end 46a extending to the angled surface 48a.

The second half nut 28b comprises an outer curved surface 32b that extends to the radial shoulder 34b which in turn extends to the outer surface 36b. The outer surface 36b extends to the angled top surface 38b that will then stretch to the first inner partially cylindrical surface 40b, with the first inner partially cylindrical surface 40b concluding at the inner shoulder 42b. The inner shoulder 42b extends to the internal thread means 44b. The internal thread means 44b will have a partial contour about the threaded stem 4. The internal thread means 44b conclude at the end 46b, with the end 46b extending to the angled surface 48b. The angled shoulder 16 of the chamber allows for the pivoting of the lips formed on the half nuts when the device 2 is disengaged.

The first nut 28a and second nut 28b will be operatively associated with the bushing 50, with the bushing 50 being a generally cylindrical member having an outer surface 52 that extends to the top angled end 54 which in turn extends to the inner bore 56, with the inner bore 56 terminating at the bottom end 58. The threaded stem 4 is disposed within the inner bore 56 of the bushing 50. There may also be included a spring 59 for biasing the first nut 28a and second nut 28b together in order to separate the upper portions of 28a and 28b so that the halves can slide up or down. In the preferred embodiment, a pair of conical springs 59, such as those illustrated in FIG. 3, will be included.

In the preferred embodiment, two springs are included, but only one is shown in the cross-section views. A stop pin "P" is also included. Generally, two pins are required in the preferred mode. The pins "P" prevent sleeve 6 and end 8 from turning around half nut 28a and half nut 28b. In the preferred embodiment, the pins "P" are embedded on opposite sides of shoulder 16 of sleeve 6. A nut "N" is also included that will allow for ease in gripping, tightening and untightening.

Figure 2:
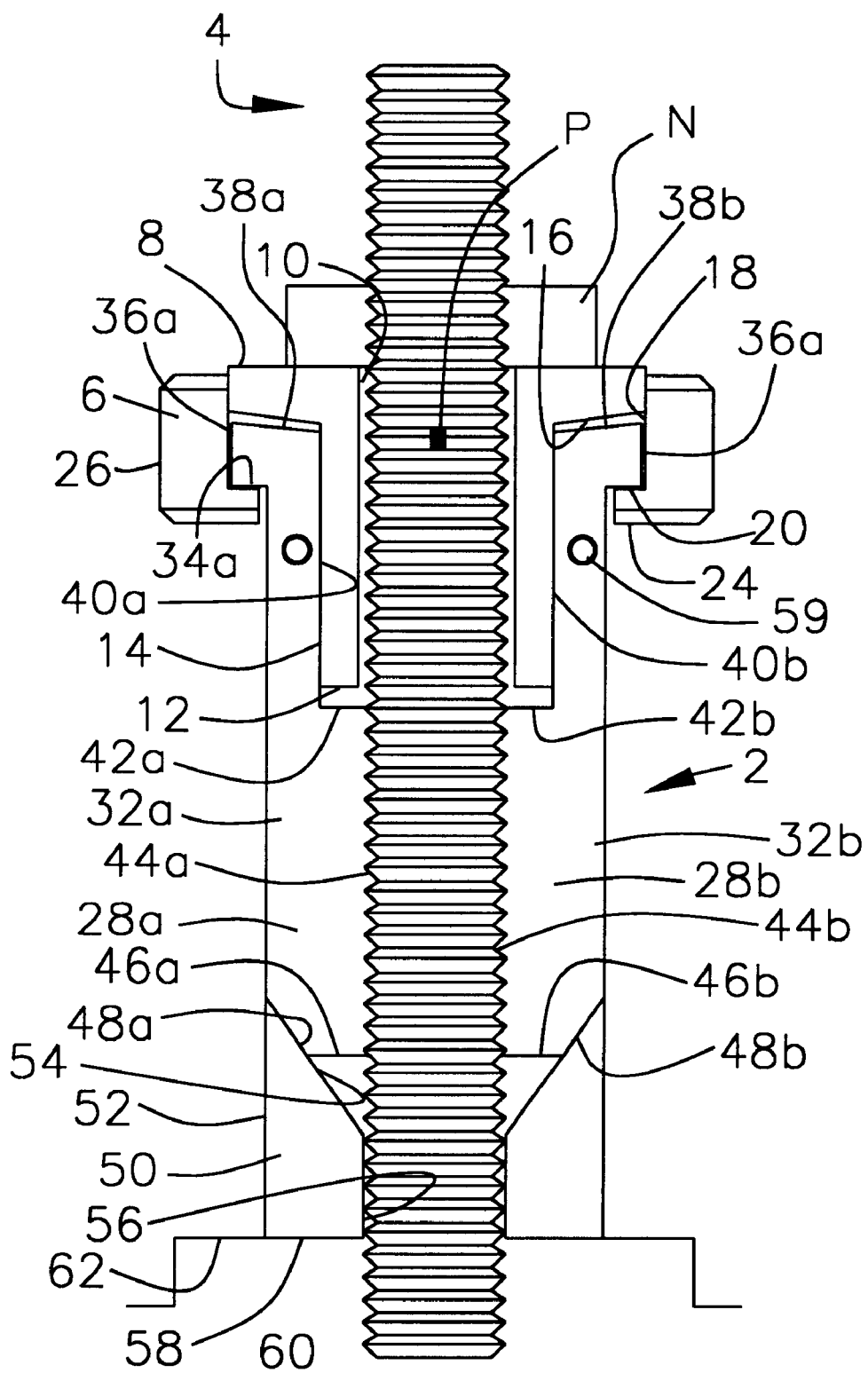
FIG. 2 is a cross-sectional view of the novel device of FIG. 1 engaging the threaded stem.

Referring now to FIG. 2, an illustration of the novel device 2 engaging the threaded stem 4. It should be noted that like numbers appearing in the various figures refer to like components. Also depicted is the pump case 60 that will have the top end 62. A puller plate may be included and is described later in the application. Thus, in this embodiment the bushing end 58 will abut the pump case top end 62. A rotational force will be exerted by the operator via a wrench about the top nut (in the case that a top nut is included on top of the sleeve 6). The nut halves 28a, 28b will travel downward on the threaded stem 4 which in turn will cause the angled end surfaces 48a and 48b downward and into engagement with the top angled end 54. The rotation action will cause the first half nut 28a and the second half nut 28b, and in particular, the internal threads 44a and 44b, to surround and engage the external threads of the threaded stem 4. It should be noted that the force of gravity will aid in urging the device 2 down into the bushing which aids in the engagement of the halves about the stem 4 by the rotational force.

In order to disengage the internal threads 44a and 44b from engaging the threaded stem 4, the operator can simply counter rotate the sleeve 6 thereby freeing the angled ends 48a, 48b from engagement with the angled end 54. The first half nut 28a and the second half nut 28b are free to expand with the aid of the two springs, such as seen in FIG. 1. The device 2 can then be moved longitudinally upward or longitudinally downward in relation to the threaded stem 4.

With reference to FIG. 3, the device as shown in FIG. 2 is illustrated without the cross-section. Thus, the outer surface 26 of sleeve 6 has been nalled for ease in gripping. FIG. 3 also depicts the first half nut 32a and second half nut 32b. As shown, the space 64 separates the two halve sections, with the springs biasing the ends of the halves 28a, 28b. The two halves 32a, 32b abut the bushing 50, with the bushing abutting the pump case 60 as previously described.

Figure 4:
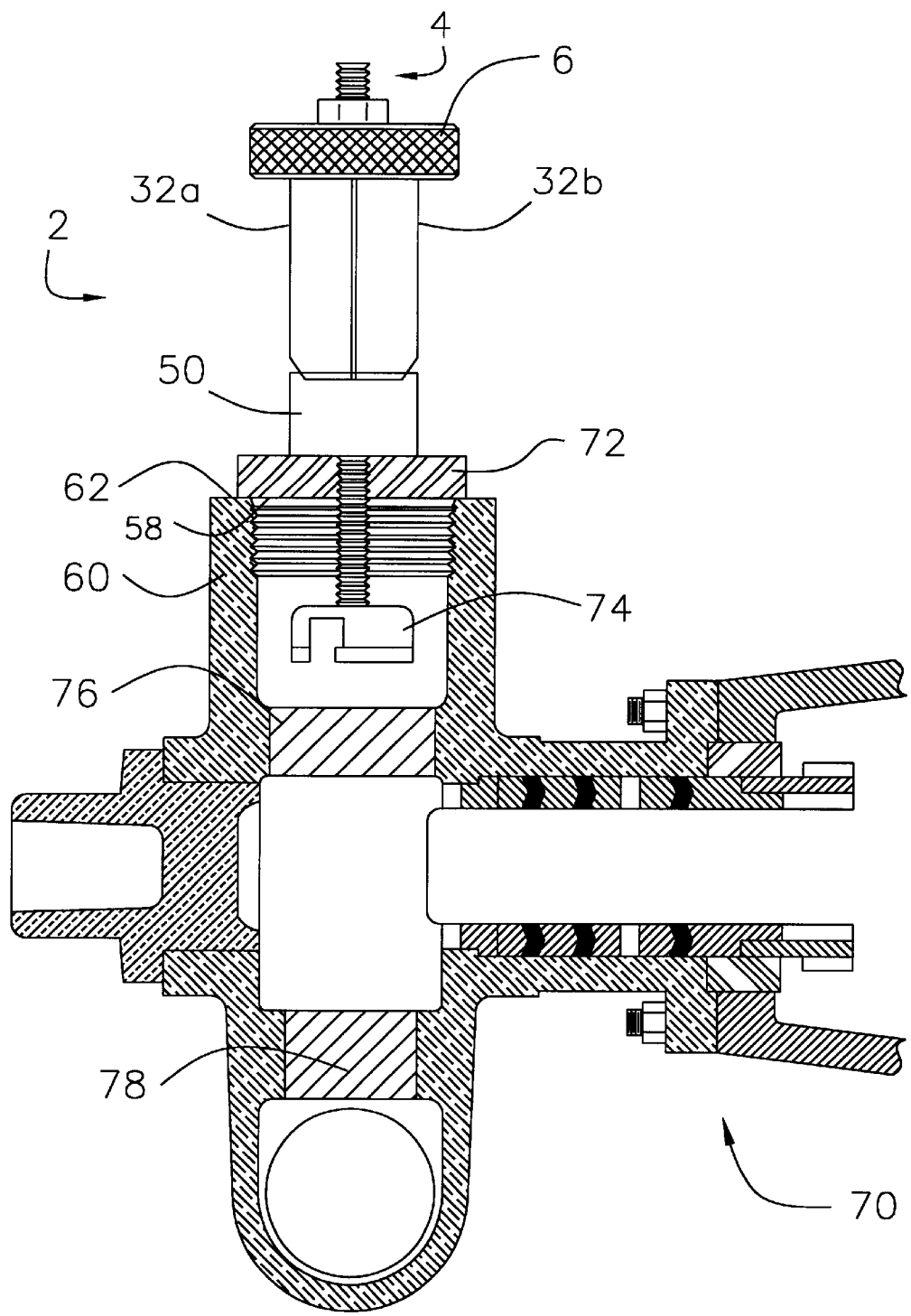
FIG. 4 is a cross-sectional view of the novel device in position to retrieve a first valve from a pump.

Referring now to FIGS. 4, 5, 6 and 7, the sequence of retrieving the valve seat from a pump will now be described. FIGS. 4, 5, 6, and 7 are cross-sectional views of the device 2 in various positions to retrieve the valves from a pump 70 having the pump case 60 and end 62. Also included in this embodiment is a puller plate 72 that is positioned on the end 62 as shown in FIG. 4. The puller plate 72 is concentrically disposed about the threaded stem 4 and is generally cylindrical with a smooth inner bore. The device 2 and puller plate 72 is lowered through the opening of the end 62. A puller plate 72 is sometimes needed when, for instance, the pump case end's diameter is larger than the bushing's diameter, as is understood by those of ordinary skill in the art.

Thus, the operator would place the bushing end 58 on the puller plate 72 and would rotate the collar 6 as previously described. The first halve 32a and second half 32b would close about the threaded stem 4. The operator may then begin rotating the threaded stem. Since the internal threads 44a, 44b are engaging the threads of the threaded stem 4, the stem 4 is incrementally moved longitudinally downward.

At the second end of the stem 4 is the valve seat puller 74. The valve seat puller is commerically available from Moores Pump Corporation of Louisiana under the name Valve Seat Puller. The valve seat puller 74 has a series of prongs that are formed so that by rotation of the stem 4, the prongs advance through the openings within the valve 76 and 78 as is well understood by those of ordinary skill in the art.

Figure 5:
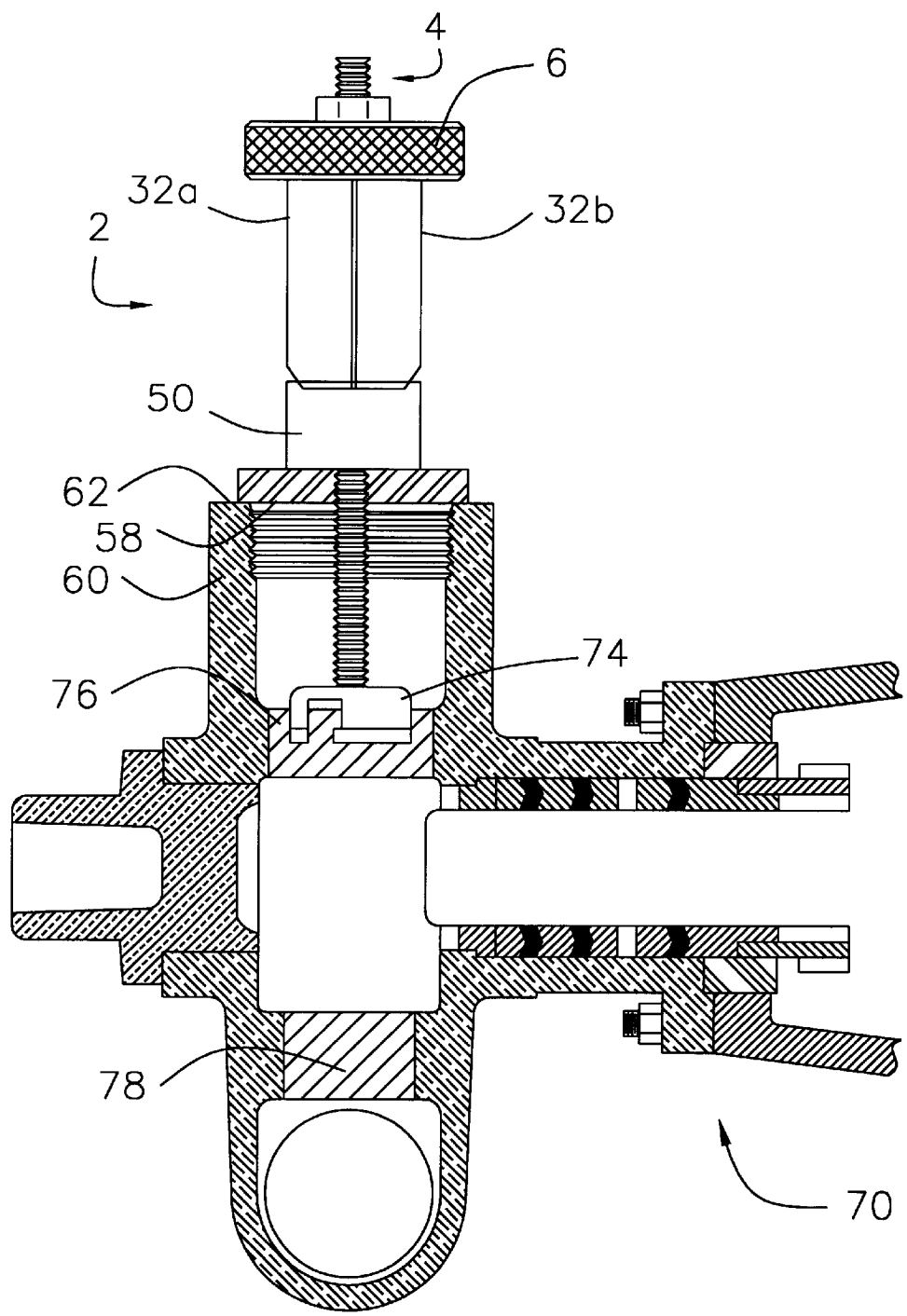
FIG. 5 is the cross-sectional view of the novel device with the valve seat puller engaging the first valve.

Thus, rotation of the stem 4 will lower the puller 74 through the valve 76 and into engagement as shown in FIG. 5. The operator can then pull upward on the stem 4. The operator would also counter rotate the collar 6. This counter rotation will release the device 2, and in particular, the internal threads 44a, 44b from engagement with the stem's 4 threads. The device can then be moved longitudinally upward. The operator would then remove the valve seat 76 from the prongs of the valve seat puller 74.

Figure 6:
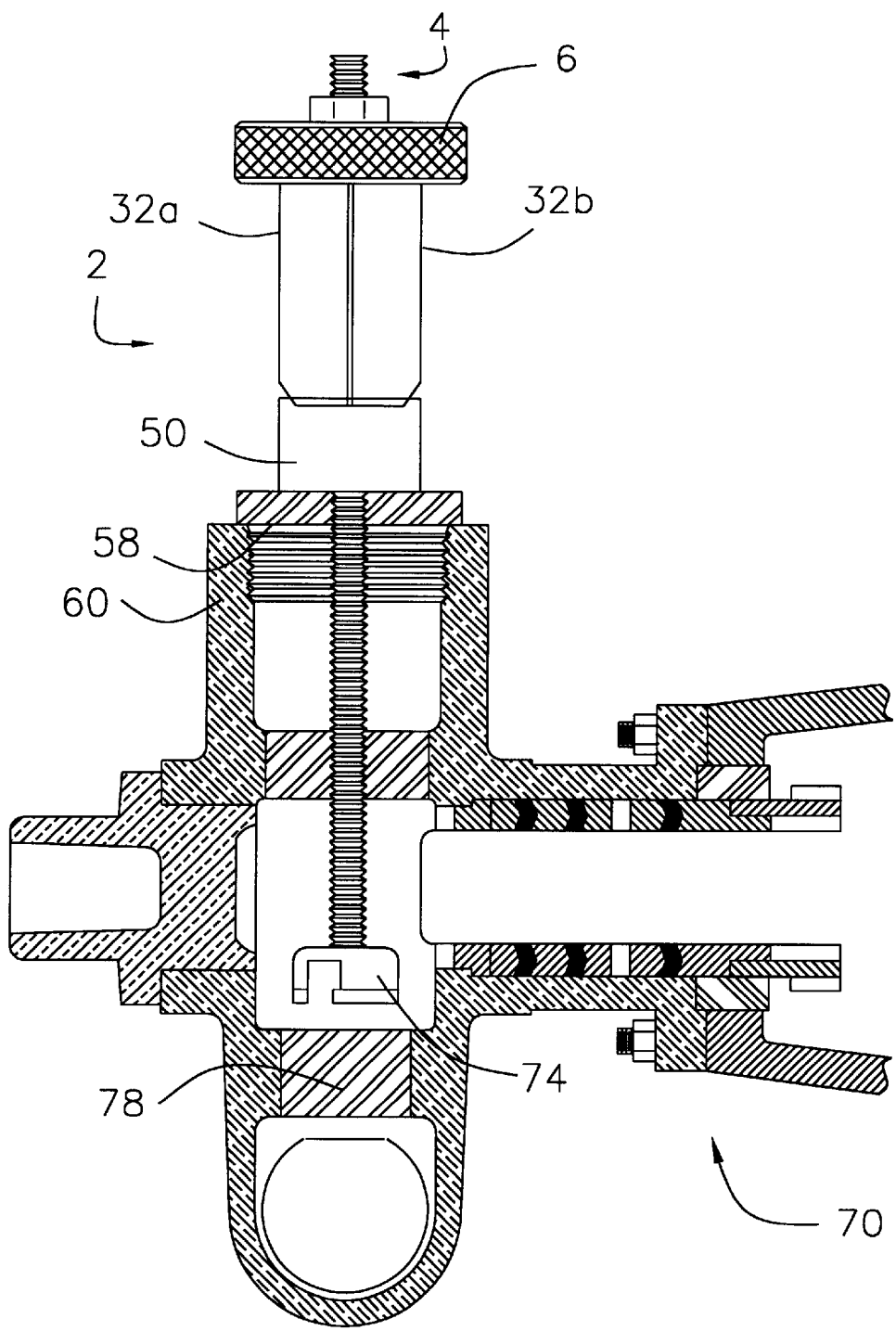
FIG. 6 is the cross-sectional view of the novel device in position to retrieve a second valve from the pump.

FIG. 6 depicts the next step in retrieval in that the device 2 is postioned in a manner similar to that described with reference to FIG. 4. Accordingly, the figure illustrates the cross-sectional view of the novel device in position to retrieve a second valve from the pump. Thus, the operator would place the bushing end 58 on the puller plate 72 and exert the rotational force on the sleeve/collar 6 as previously described. The first halve 32a and second half 32b would close about the threaded stem 4. The operator may then begin rotating the threaded stem 4. Since the internal threads 44a, 44b are engaging the threads of the threaded stem 4, the stem 4 is incrementally moved longitudinally downward.

Figure 7:
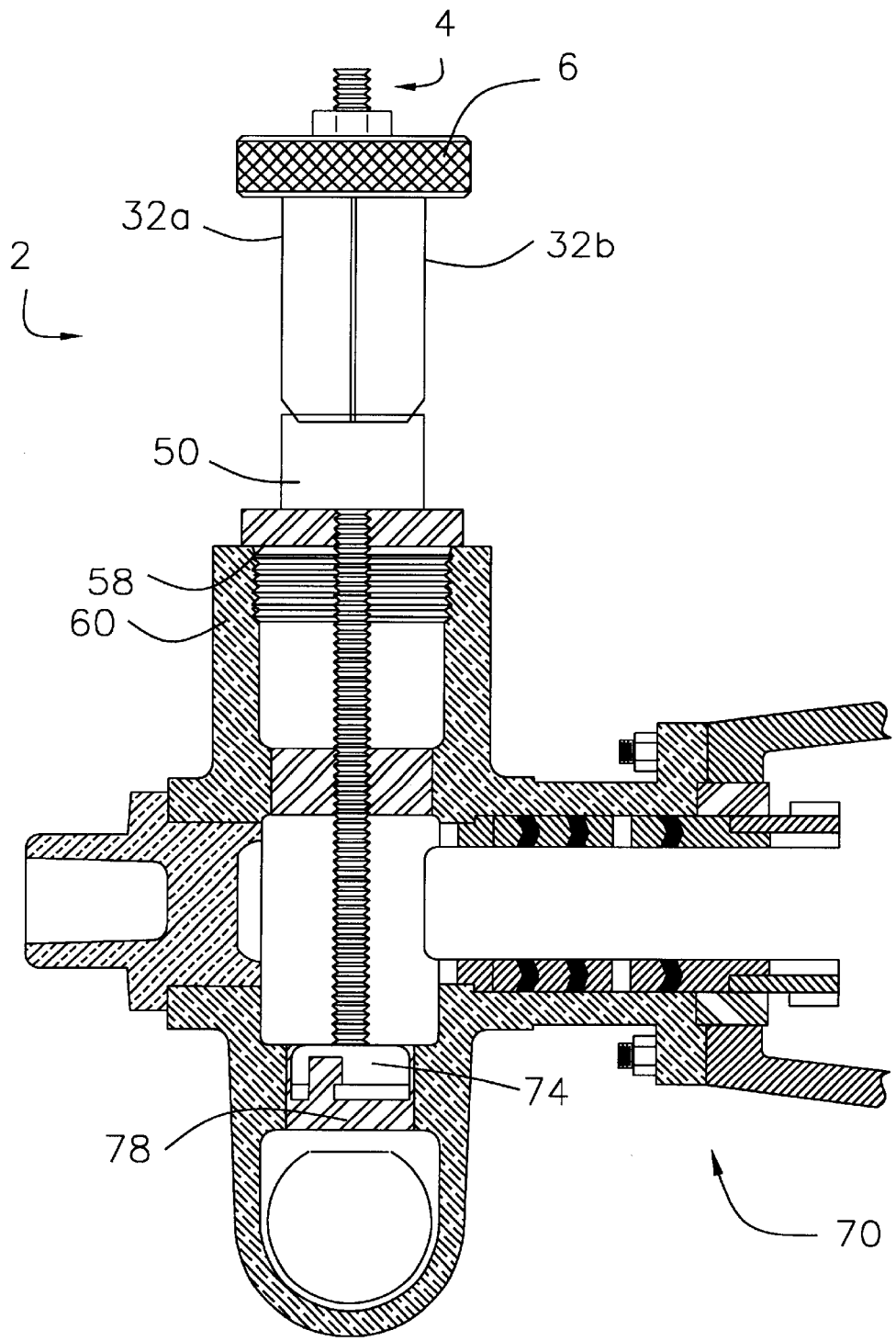
FIG. 7 is the cross-sectional view of the novel device with the valve seat puller engaging the second valve.

At the second end of the stem 4 is the valve seat puller 74. The prongs advance through the openings with the valve 78. FIG. 7 is the cross-sectional view of the novel device with the valve seat puller engaging the second valve. The rotation of the stem 4 will lower the puller 74 through the valve 78 and into engagement as shown in FIG. 7. The operator can then release the downward force on the sleeve 6, thereby releasing the internal threads 44a, 44b from engagement. Next, the operator would pull upward on the stem 4. This upward pull will cause the threads 44a, 44b to slip past the threads 4. The device can then be moved longitudinally upward. The operator would then remove the valve seat 78 from the prongs of the valve seat puller 74.

Changes and modifications in the specifically described embodiments can be carried out without departing from the scope of the invention which is intended to be limited only by the scope of the appended claims.

I claim:

1. A method of removing a first valve seat and a second valve seat with a device, the device comprising a threaded bolt containing external thread means; a puller plate having an inner surface which contains said threaded stem therethrough, and wherein said bushing has a first end and a second end; a first halve nut containing a first internal thread means partially engaging said external thread means, and a second halve nut containing a second internal thread means, and wherein said first end of said bushing abuts said first halve nut and said second halve nut; a sleeve having an outer portion and an inner portion, and wherein said inner portion has said threaded bolt therethrough; and wherein said sleeve engages said first halve segment and said second halve segment; a valve seat puller attached to said threaded stem; and wherein the method comprises:

placing said puller plate on an opening of a pump;

advancing said first halve nut and said second half nut about said threaded bolt;

abutting said angled end of said first halve nut against said puller plate;

abutting said angled end of said second halve nut against said puller plate;

exerting a rotating force on said sleeve;

closing said first halve nut and said second half nut about said threaded bolt;

rotating said threaded bolt;

passing said threads of said threaded bolt through said first internal thread means and said second internal thread means;

advancing said valve seat puller;

engaging the first valve seat with said valve seat puller.

2. The method of claim 1 further comprising:

releasing said downward force on said sleeve;

exerting an upward force on said threaded bolt;

expanding said first halve nut and said second half nut about said threaded stem;

removing said first valve seat.

3. The method of claim 2 further comprising:
placing said puller plate on the outlet of the pump;
advancing said first halve nut and said second half nut;
abutting said angled end of said first halve nut against said puller plate;
abutting said angled end of said second halve nut against said puller plate;
exerting a rotational force on said sleeve;
closing said first halve nut and said second half nut about said threaded bolt;
rotating said threaded bolt;
advancing said valve seat puller;
engaging a second valve seat with said valve seat puller.

4. The method of claim 3 further comprising:
exerting a counter rotating force on said sleeve;
exerting an upward force on said threaded stem;
expanding said first halve nut and said second half nut about said threaded bolt;
removing said first valve seat.

5. The method of claim 4 wherein the step of rotating said threaded bolt includes passing said threads of said threaded bolt through said first internal thread means and said second internal thread means.

* * * * *